US007753791B2

(12) United States Patent
Hartwell

(10) Patent No.: US 7,753,791 B2
(45) Date of Patent: Jul. 13, 2010

(54) METHODS AND SYSTEMS FOR THE TRANSMISSION OF INTERACTIVE GAME ATTRIBUTES THROUGH A WIRELESS NETWORK

(75) Inventor: Joshua Hartwell, Santa Monica, CA (US)

(73) Assignee: GCSUB 60, Inc., Santa Monica, CA (US)

( * ) Notice: Subject to any disclaimer, the term of this patent is extended or adjusted under 35 U.S.C. 154(b) by 174 days.

(21) Appl. No.: 11/357,694

(22) Filed: Feb. 17, 2006

(65) Prior Publication Data

US 2007/0197283 A1 Aug. 23, 2007

(51) Int. Cl.
*A63F 9/24* (2006.01)
*A63F 13/00* (2006.01)
*G06F 17/00* (2006.01)
*G06F 19/00* (2006.01)

(52) U.S. Cl. .............................. 463/42; 463/39; 463/40

(58) Field of Classification Search .................. 463/39, 463/40, 42

See application file for complete search history.

(56) References Cited

U.S. PATENT DOCUMENTS 6,758,757 B2 7/2004 Luciano, Jr. et al.
6,800,027 B2 10/2004 Giobbi et al.
6,811,486 B1 11/2004 Luciano, Jr.
6,884,172 B1 4/2005 Lloyd et al.
6,893,347 B1 * 5/2005 Zilliacus et al. ............... 463/41
7,398,081 B2 * 7/2008 Moran ..................... 455/414.1
2001/0046893 A1 11/2001 Giobbl et al.
2004/0198403 A1 * 10/2004 Pedersen et al. ............ 455/517
2004/0224769 A1 11/2004 Hansen et al.
2005/0169235 A1 * 8/2005 Hutcheson et al. .......... 370/350
2006/0015201 A1 1/2006 Lapstun et al.
2007/0117621 A1 * 5/2007 Walker et al. ................. 463/29
2007/0179842 A1 * 8/2007 Chen ........................... 705/14

FOREIGN PATENT DOCUMENTS

EP 1086732 A1 * 3/2001
GB 2430893 A * 4/2007

* cited by examiner

*Primary Examiner*—John M Hotaling
*Assistant Examiner*—Adetokunbo Torimiro
(74) *Attorney, Agent, or Firm*—Finnegan, Henderson, Farabow, Garrett and Dunner, L.L.P.

(57) ABSTRACT

The present invention is directed, in part, to providing duplicate instances of a particular interactive game on multiple wireless devices. When a first instance of an interactive game is initiated on a first wireless device, a unique identifier is assigned to that particular instance. The unique identifier may then be sent to a second wireless device, which may use the unique identifier to initiate a duplicate instance of the interactive game. The unique identifier may be sent through any messaging scheme for wireless devices, such as text messaging.

21 Claims, 1 Drawing Sheet

METHODS AND SYSTEMS FOR THE TRANSMISSION OF INTERACTIVE GAME ATTRIBUTES THROUGH A WIRELESS NETWORK

DESCRIPTION OF THE INVENTION

The invention is generally directed to providing a predetermined instance of an interactive game on wireless devices. More particularly, the invention is directed to providing duplicate predetermined instances of a particular interactive game on multiple wireless devices. For example, the invention allows a first user playing an interactive game on a first wireless device to send at least one game attribute (such as a hand dealt in solitaire or a puzzle grid in sudoku) to a second user with a second wireless device.

DETAILED DESCRIPTION

Figure 1:
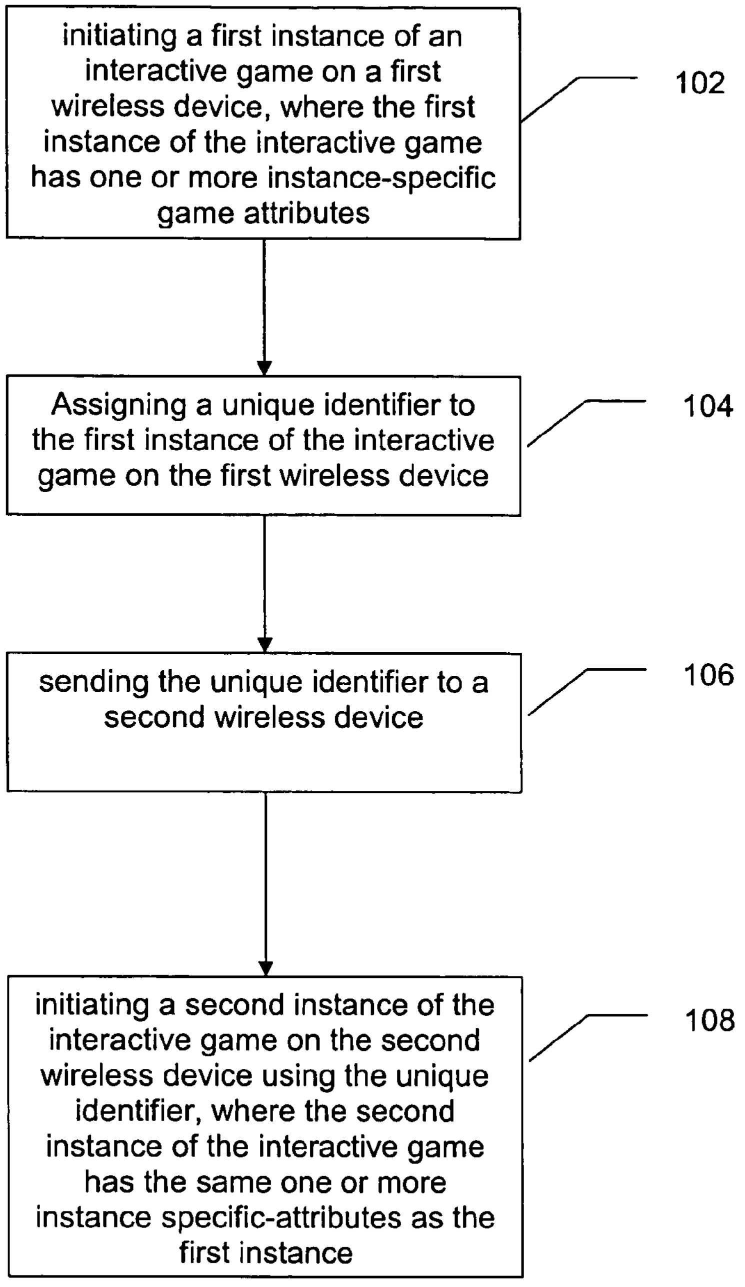
FIG. 1 is a flowchart of one embodiment of the present invention, illustrating stages involved in providing duplicate predetermined instances of an interactive game on multiple devices in a wireless network.

It is to be understood that both the foregoing Description of the Invention and the following Detailed Description are exemplary and explanatory only and are not restrictive of the invention as claimed. Combinations and variants of the individual embodiments discussed are both fully envisioned and intended. Although the foregoing Description of the Invention and the following Detailed Description may generally discuss an interactive game, an interactive game is not intended to be the only form of program envisioned under the present description. Additional programs that may be used include, for example, application programs, graphics programs, and gaming programs. As used herein, "at least one" means one or more.

The accompanying drawing, which is incorporated in and constitutes a part of this specification, illustrates an embodiment of the invention and, together with the description, serves to explain the principles of the invention.

The present invention allows a user of a first wireless device to share at least one interactive game attribute with a user of a second wireless device. With reference to the exemplary embodiment shown in FIG. 1, at stage 102, a first instance of an interactive game is initiated on a first wireless device. The first wireless device may be, for example, a cellular phone, a personal digital assistant (PDA), or any other wireless device capable of data communication through a wireless and/or telephonic network. The interactive game may be installed or otherwise implemented on the first wireless device. Suitable interactive games may include, for example, solitaire, sudoku, blackjack, or any other game that may be played on a wireless device. While the present specification may be directed to interactive game programs, the present invention also encompasses non-game programs, such as, for example, a calendaring program or a travel receipt-tracking program, and can be applied to those programs without departing from the spirit of the present invention.

When a first instance of an interactive game is initiated, one or more instance-specific game attributes may be displayed or generated on the first wireless device. The instance-specific game attributes may include, for example, a particular arrangement of cards in a solitaire game, a particular shuffle or hand in a blackjack game, a specific sudoku puzzle, or any other suitable game attributes specifically associated with a single instance of the interactive game. For non-game programs, the instance-specific attributes may include, for example, a calendar entry, a travel receipt, or a picture file.

At stage 104 of FIG. 1, a unique identifier may be assigned to the first instance of the interactive game with its associated instance-specific game attributes. While the assignment of the unique identifier is shown in this flowchart as being subsequent to the initiation of the first instance of the interactive game, it will be understood that this assignment may also take place concurrently with or prior to the initiation of the first instance. In one suitable arrangement, the unique identifier may be generated by a random number generator or any other suitable mechanism. Being specifically assigned to a particular instance, and including its one or more instance-specific game attributes, the unique identifier is capable of identifying a particular hand dealt in a game of blackjack, a particular card arrangement in a game of solitaire, a particular puzzle in a game of sudoku, or any other suitable instance-specific game attributes, as well as suitable instance-specific attributes of non-game programs.

In some arrangements consistent with the principles of the present invention, the interactive game may use the unique identifier and/or a combination of criteria, which may include the unique identifier and other game-related criteria, to construct a particular instance of the game. The particular instance of the game may be reconstructed to start at any point during the game progression of the original game based on which it is generated. In one suitable example, the unique identifier or the combination of criteria may be input into a mathematical formula or any other suitable process, in which it may be used to calculate, look up in a table, or otherwise generate a specific instance of the interactive game. In one suitable arrangement, the specific reconstructed game instance may duplicate a particular point in the progression of the original game based on which it is generated, for example, at the point in the original game at which the specific reconstructed game instance is generated. In one suitable arrangement, if the specific reconstructed game instance is started at the end of the game, the scores and/or other statistics associated with the original game may be presented in the reconstructed instance of the game.

In some suitable arrangements, the instance generation process may be such that a particular instance having a particular set of instance-specific attributes may be duplicated when the same unique identifier or the same combination of criteria is inputted either on a different wireless device at the same or different time, or on the same wireless device at a different time. In this way, the interactive game may reproduce a particular hand in a blackjack game, a particular card arrangement in solitaire, a particular sudoku puzzle, or any other suitable game instance, by initiating a new instance using the unique identifier associated with a desirable previous instance of the interactive game.

At stage 106 of FIG. 1, the unique identifier associated with the first instance of the interactive game may be sent to a second wireless device, for example, in response to a user request or to a user's confirmation of an automatic feature that would send a unique identifier. In one suitable example, a user, while trying to solve a particular sudoku puzzle on a first wireless device, may wish to share that puzzle with a second user at a different wireless device. In another suitable example, a user may wish to share a specific attribute of a non-game program, such as a calendar entry, with a second user at a different wireless device. Consistent with the principles of the present invention, the interactive game on the first wireless device may provide a game option menu, key stroke, or another suitable mechanism to enable the first user to send the particular puzzle to the second user via a messaging structure, for example, via a text message. One suitable form of such a text message may be a Short Message Service (SMS) message. Another suitable form of such a text message may be a Multimedia message. More specifically, the first user, while playing a game of solitaire, blackjack, soduku, or any other suitable game, may be provided with the option to compose a message, to which the unique identifier associated with the particular game that is being played may be included or attached. In some suitable arrangements, message suggestions may be presented to the user, for example, based on the point in the game progression at which the message is being composed. As an example, the user may be provided with a message such as "I'm stuck. Can you help me?" if the message is being composed at the middle of the game. As another example, a message stating "Victory is mine!" may be suggested if the message is being composed at the end of a game, which may have been won or otherwise fully completed. In some arrangements, the attachment of the unique identifier may be automatically performed without user action. In fact, in such an arrangement, the user may optionally be completely unaware of or not have access to the unique identifier. In other arrangements, the user may access or obtain and communicate the unique identifier to the second user in a text message or other messaging structure. Any other suitable arrangements for communicating the unique identifier to a second wireless device by a messaging structure may be used without departing from the spirit of the present invention, such as, for example, an instant message (i.e., using a Yahoo!® or Google® instant messaging platform) or an electronic mail item.

At stage 108 of FIG. 1, a second instance of the interactive game may be initiated on the second wireless device using the received unique identifier. As mentioned above in connection with stage 106 of FIG. 1, the unique identifier may be sent to the second wireless device included in or as an attachment to a text message. In accordance with such an arrangement, the user of the second device may view the text message and may be provided with an option to initiate the second instance of the interactive game in connection with the text message. If the user of the second device chooses to initiate the second instance, the unique identifier may be automatically extracted from the text message to generate the second instance of the interactive game. If the user of the second device chooses not to initiate the second instance, that user may be allowed to retain or save the text message in order to generate the second instance of the interactive game at a later time. The user of the second device may also have the ability to forward or re-send the text message in order to further share the second instance of the interactive game. In any such arrangement, the second user may not have access to or may be completely unaware of the unique identifier or the extraction. Alternatively, the unique identifier may be displayed to the second user, for example, in the text message, which the second user may manually supply to the interactive game to initiate the second instance. Any other suitable arrangements of extracting and inputting the unique identifier to initiate the second instance of the interactive game may be used without departing from the spirit of the present invention.

Similar to the initiation procedures discussed above in connection with the first instance of the interactive game, the second instance of the interactive game may be initiated by, for example, inputting the unique identifier into a formula or another suitable process to generate the instance-specific attributes. Because the same unique identifier, which was used to generate the first instance on the first wireless device is used to generate the second instance on the second wireless device, the second instance may possess or assume the exact same or similar instance-specific attributes. For example, the same sudoku puzzle from a first instance may be initiated in a second instance. As another example, the same sudoku puzzle from a first instance may be initiated in its completed form in a second instance. As a further example, the same sudoku puzzle from a first instance may be initiated in its initial or beginning form in a second instance. As yet a further example, the same sudoku puzzle from a first instance may be initiated in its intermediate form in a second instance (such as, the point at which the first user saved the same or initiated the sending of at least one game-specific attribute). As another example, the same calendar entry from a first instance may be inserted into the calendar of a second instance.

As a result of performing stages 102-108 in FIG. 1, two identical instances of the interactive game may now be played by two different users, at different paces and/or on two different wireless devices. In this way, the present invention enables the first user to share a gaming experience with a second user without disrupting his own game.

In some suitable arrangements, the present invention may serve as a marketing vehicle to promote the installation or implementation of a particular interactive game on a wireless device. As an example, the second wireless device, which receives the unique identifier at stage 106 of FIG. 1, may not have installed or otherwise implemented the interactive game for initiating the second instance. In such a situation, the text message or other suitable medium to which the unique identifier is attached may invoke or otherwise cause the display of one or more resources, such as a website, at which the appropriate software or other required resources for installing or implementing the interactive game may be downloaded, purchased, or otherwise obtained. In this way, the first user may promote or market a game to a second user and provide easy access to the resources that would allow the second user to obtain that game.

It will be understood that stages 102-108 of FIG. 1 are merely illustrative of the stages that may be performed consistent with the principles of the present invention. Stages may be added, removed, inserted, appended, or otherwise modified without departing from the spirit of the present invention. One suitable variation consistent with the principles of the present invention may be that the first user, instead of sending the unique identifier to a second wireless device, may send the unique identifier to any other device with which it may communicate through the wireless network. As an example, the unique identifier may be sent to the first user's home PC, capable television, or any other suitable device. In some arrangements, the receiving device may use the unique identifier to initiate an instance of the interactive game in a similar fashion to the initiation process described above in connection with a wireless device. In other arrangements, the user may use such a device as a storage location for the unique identifier, which may later be retrieved to initiate a duplicate instance of the interactive game on the user's wireless device. Moreover, as wireless devices such as mobile phones and personal digital assistants are able to communicate by means other than wireless networks (such as, for example, by wireless networks using TCP/IP protocols, or by Bluetooth®), the present invention may be used to transmit or send game attributes through those additional communication means.

Other embodiments of the described invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for providing at least one game attribute in a wireless network, the method comprising:

initiating a first instance of a game on a first wireless device, wherein the first instance of the game has at least one instance-specific game attribute related to a particular game situation in the first instance of the game being played on the first wireless device;

assigning a unique identifier to the first instance of the game having the at least one instance-specific game attribute related to the particular game situation on the first wireless device;

sending the unique identifier from the first wireless device to a second wireless device through a wireless network;

wherein upon initiating a second instance of the game on the second wireless device using the unique identifier, the second instance of the game assumes the at least one instance-specific game attribute to recreate the particular game situation in the first instance of the game being played on the first wireless device such that the second instance of the game is played on the second wireless device independently of any participation from the first wireless device, and the first and second instances of the game progress differently from the particular game situation.

2. The method of claim 1, wherein sending the unique identifier to a second wireless device comprises the game on the first wireless device sending a text message through a wireless network to the second wireless device, wherein the text message comprises the unique identifier.

3. The method of claim 1, wherein the game is solitaire.

4. The method of claim 1, wherein the game is sudoku.

5. The method of claim 1, wherein the game is blackjack.

6. The method of claim 1, wherein the second instance of the game assumes a specific point in game progression associated with the first instance of the interactive game.

7. The method of claim 2, wherein the text message may be automatically suggested.

8. The method of claim 2, wherein the text message may be automatically suggested based on a specific point in game progression in the first instance of the game.

9. A system for providing at least one game attribute in a wireless network, the system comprising:

means for initiating a first instance of a game on a first wireless device, wherein the first instance of the game has at least one instance-specific game attribute related to a particular game situation in the first instance of the game being played on the first wireless device;

means for assigning a unique identifier to the first instance of the game having the at least one instance-specific game attribute related to the particular game situation on the first wireless device;

means for sending the unique identifier from the first wireless device to a second wireless device through a wireless network;

wherein upon initiating a second instance of the game on the second wireless device using the unique identifier, the second instance of the game assumes the at least one instance-specific game attribute to recreate the particular game situation in the first instance of the game being played on the first wireless device such that the second instance of the game is played on the second wireless device independently of any participation from the first wireless device, and the first and second instances of the game progress differently from the particular game situation.

10. The system of claim 9, wherein sending the unique identifier to a second wireless device comprises the game on the first wireless device sending a text message through a wireless network to the second wireless device, wherein the text message comprises the unique identifier.

11. The system of claim 9, wherein the game is solitaire.

12. The system of claim 9, wherein the game is sudoku.

13. The system of claim 9, wherein the game is blackjack.

14. The system of claim 9, wherein the second instance of the game assumes a specific point in game progression associated with the first instance of the interactive game.

15. The system of claim 10, wherein the text message may be automatically suggested.

16. The system of claim 10, wherein the text message may be automatically suggested based on a specific point in game progression in the first instance of the game.

17. A machine-readable medium including instructions for performing, when executed by a processor, a method for providing at least one game attribute in a wireless network, the method comprising:

initiating a first instance of a game on a first wireless device, wherein the first instance of the game has at least one instance-specific game attribute related to a particular game situation in the first instance of the game being played on the first wireless device;

assigning a unique identifier to the first instance of the game having the at least one instance-specific game attribute related to the particular game situation on the first wireless device;

sending the unique identifier from the first wireless device to a second wireless device through a wireless network;

wherein upon initiating a second instance of the game on the second wireless device using the unique identifier, the second instance of the game assumes the at least one instance-specific game attribute to recreate the particular game situation in the first instance of the game being played on the first wireless device such that the second instance of the game is played on the second wireless device independently of any participation from the first wireless device, and the first and second instances of the game progress differently from the particular game situation.

18. The machine-readable medium of claim 17 further includes instructions for the game on the first wireless device sending a text message through a wireless network to the second wireless device, wherein the text message comprises the unique identifier.

19. The machine-readable medium of claim 17, wherein the game is solitaire.

20. The method of claim 17, wherein the game is sudoku.

21. A method for transmitting at least one program attribute from a first wireless device to a second wireless device, the method comprising:

initiating a first instance of a program on the first wireless device, wherein the first instance of the program has at least one instance-specific attribute related to a particular situation in the first instance of the program;

assigning a unique identifier to the first instance of the program having the at least one instance-specific attribute related to the particular situation in the first instance of the program on the first wireless device;

sending the unique identifier from the first wireless device to the second wireless device through a network;

wherein upon initiating a second instance of the program on the second wireless device using the unique identifier, the second instance of the game assumes the at least one instance-specific attribute to recreate the particular situation in the first instance of the program such that user-interaction and running of the second instance of the program on the second wireless device is independent from participation from the first wireless device and the first and second instances of the program progress differently from the particular situation.

* * * * *

UNITED STATES PATENT AND TRADEMARK OFFICE

CERTIFICATE OF CORRECTION

PATENT NO. : 7,753,791 B2
APPLICATION NO. : 11/357694
DATED : July 13, 2010
INVENTOR(S) : Joshua Hartwell It is certified that error appears in the above-identified patent and that said Letters Patent is hereby corrected as shown below:

Title page, item 73, “GCSUB” should read --GOSUB--.

Signed and Sealed this

Seventh Day of September, 2010

David J. Kappos
*Director of the United States Patent and Trademark Office*